May 13, 1958 R. W. SONNENFELDT 2,834,882

ELECTRIC WAVE AMPLITUDE CLIPPING CIRCUIT

Filed Aug. 17, 1954

INVENTOR.
RICHARD W. SONNENFELDT
BY
[signature]
ATTORNEY

United States Patent Office 2,834,882
Patented May 13, 1958

2,834,882

ELECTRIC WAVE AMPLITUDE CLIPPING CIRCUIT

Richard Wolfgang Sonnenfeldt, Haddonfield, N. J., assignor to Radio Corporation of America, a corporation of Delaware Application August 17, 1954, Serial No. 450,418
8 Claims. (Cl. 250—27)

Figure 1:
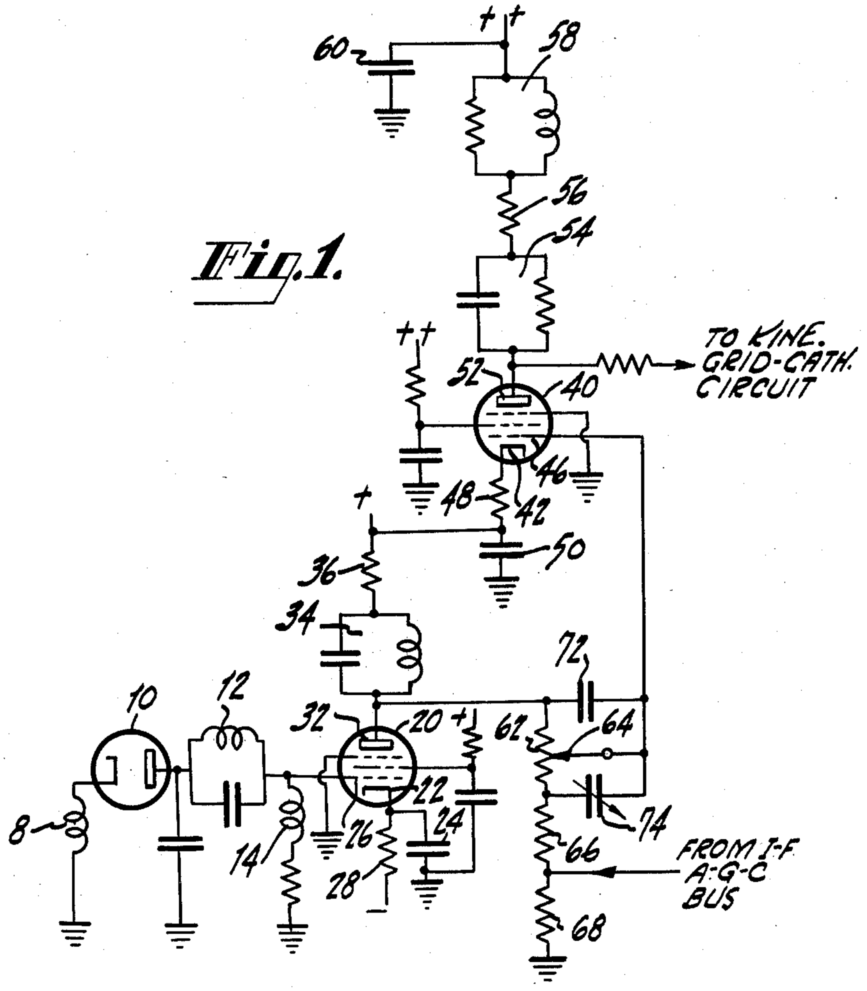

The invention relates to electric wave amplitude clipping circuit arrangements and it particularly pertains to such circuit arrangements for reducing noise in the extrawhite region of the video signal as applied to the image reproducing device of a television receiver.

The term "clipping" as used hereinafter is construed to include all forms of rendering a portion of the amplitude variation of an electric wave ineffective without otherwise affecting the remainder of the wave as distinguished from "limiting" in the special sense where the entire variation in amplitude is fixed.

The term "thresholding" as used hereinafter is construed to mean a special case of clipping wherein only the lower amplitude portion of the wave signal is eliminated by adjusting the bias on electron discharge devices or the like to render the portion of the wave signal of amplitude below the bias level ineffective in causing current flow in the thresholding circuit.

There are many practical instances in which it is desirable to clip or threshold an electric wave. For example, it is highly desirable to eliminate the random noise analogous to the hissing sound of random noise in an aural system, which may accompany the video signal and appear in visible form on the face of the image reproducing device or kinescope of a television receiver. The most disconcerting form of such noise, which appears as fine, closely-packed black and white spots in relatively random motion, is so similar in appearance to a swirling snow storm as to warrant the popular nickname of "snow." Although this noise appears for all amplitude levels of the television video signal, it is particularly disconcerting near the white level and again near the black level. It has, therefore, been suggested that these particularly undesirable effects of noise in the video frequency channel of a television receiver may be removed by clipping the video signal wave at the appropriate circuit point of the television receiver. For instance, it has been suggested that the noise components near one extreme amplitude level be eliminated by clipping off all of the wave near that extreme amplitude level by rendering extreme amplitude excursions ineffective by thresholding.

An object of the invention is to provide an improved clipping or thresholding circuit arrangement.

Another object is to provide an improved clipping or thresholding arrangement particularly for use with wide band amplifiers of the type used in television receiver video amplifier circuits.

A further object of the invention is to provide a simplified clipping or thresholding circuit which does not require more than a few component parts.

Still another object is to provide a simplified clipping circuit which does not distort the wave signal being translated.

A still further object of the invention is to provide a clipping or thresholding circuit applicable to television receivers for reducing the visibility of noise or "snow" without using non-linear amplifiers or detectors.

The objects of the invention are obtained in a wave signal amplifier system having at least one amplifier device connected by means of a coupling circuit capable of carrying direct current to a source of the wave signal to be translated, usually another amplifier device. The coupling circuit comprises a pair of resistive elements connected in series and coupled to the output circuit of one of the amplifier devices, one of the resistive elements forming the input impedance element of the other amplifier device and the other resistive element having a tapping thereon connected for direct current translation to the input circuit of the other of the amplifier devices and forming the clipping level adjusting element of the circuit. Capacitive reactance elements are connected between the tapping and the terminals of the other resistive element and have values of capacity at which the adjustable resistive element is short-circuited insofar as the A.-C. component of the signal wave is concerned and the entire wave signal voltage applied to the subsequent amplifier device is presented across the input resistive element. The D.-C. component of the signal, however, is presented across this input resistive element and the portion of the level adjusting resistive element between the tapping and the junction of the two resistive elements. By adjusting the tapping on the level adjusting resistive element the bias on the succeeding amplifier device is set and all of the wave signal voltage below a desired value is ineffective. For example, in a television receiver the video signal ampliler system according to to the invention is preferably set to clip all noise in the extrawhite—that is, whiter-than-transmitter-white—region and up to the level corresponding to 15% modulation of the carrier wave.

Figure 2:
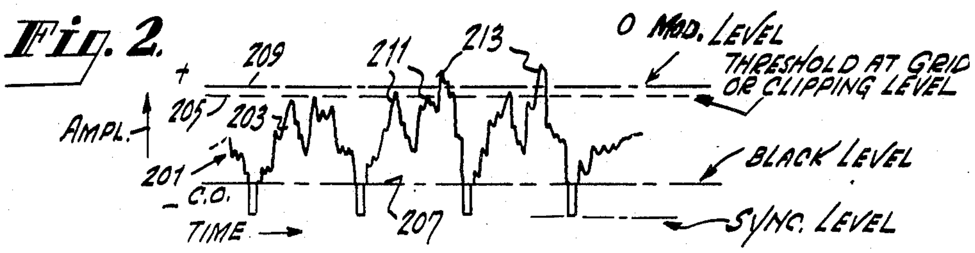

In order that the invention may be more fully understood and readily put to use, a detailed description of a specific embodiment thereof, by way of example only, is given below with reference to the accompanying drawing forming a part of the specification and in which:

Fig. 1 is a schematic diagram of a clipping and/or thresholding circuit according to the invention; and Fig. 2 is a graphical representation of a waveform useful in the explanation of the operation of the circuit shown in Fig. 1.

Referring to Fig. 1 there is shown a schematic diagram of a wave signal amplifier system, particularly for use as a video amplifier in a television receiving circuit arrangement, comprising two direct coupled amplifier devices connected to the video signal input circuit at the output of a video detector. A video frequency modulated wave is induced in an input winding 8 of a television receiver for subsequent rectification by a unilateral impedance detector element shown here as a high vacuum diode 10, connected by means of a peaking coil 12 to a detector load element 14 across which a composite video signal is presented. The video wave signal amplifier system according to the invention comprises an input controlled electron flow path device shown here as a thermionic cathode electron discharge device or pentode vacuum tube 20 having a common circuit electrode or cathode 22 coupled to one terminal of the detector load element 14 by means of a bypass capacitor 24 and an input circuit electrode or control grid 26 connected to the other terminal of the detector load element 14. Grid bias for the input vacuum tube 20 is provided by a cathode resistor 28. The screen and suppressor grids are connected in the usual manner for tubes of this type and these elements will not be mentioned further. It should be understood that the circuit arrangement of the invention is also applicable to three and four electrode amplifier devices as well as pentode vacuum tubes. The output circuit of the tube 20 is constituted by the cathode 22 and an output circuit elecerode or anode 32. The anode 32 is connected to one terminal of an anode load element 34, the other terminal of which is connected by means of a resistor 36 to a point of positive potential.

The succeeding video wave signal amplifier device comprises an output pentode vacuum tube 40 which may be similar to the input tube 20 having a cathode 42 and a control grid 46. The control grid 46 and the cathode 42 in conjunction provide the input circuit of the output amplifier device or tube 40. The cathode 42 of the tube 40 is connected to the point of positive potential preferably through a resistor 48 and the point of connection is preferably connected to a point of fixed reference potential by means of a large bypass capacitor 50. As with the input tube 20, the screen and suppressor grids of the output tube 40 are connected in conventional manner. The anode 52 is connected to a source of potential more positive than the previously mentioned potential source through the intermediary of anode load elements 54, 56 and 58, the potential across which is applied to a utilization circuit, which in the example of a video amplifier given would be the grid-cathode circuit of an image reproducing device or kinescope (not shown).

According to the invention, the anode 32 of the input amplifier device or tube 20 is directly connected to the grid 46 of the output amplifier device or tube 40 by means of a direct current translating system comprising a portion of a resistive element 62 located between the terminal connected to the anode 32 of the input amplifier device 20 and the arm 64. The resistive element 62 and another resistive element 66 are connected in series between the anode 32 of the input amplifier device and a point of fixed reference potential, shown as ground, by means of a resistance component 68 of an A.-G.-C. filter network (the remainder of which is not shown except for a lead from the A.-G.-C. bus). A fixed capacitive reactance element 72 and an adjustable capacitive reactance element 74 are provided of sufficient capacity to effectively short-circuit the tapped resistive element 62 for all frequencies to be translated by the wave signal amplifier system, which in the case of the video amplifier means at least all frequencies from 30 cycles to approximately 4.5 megacycles per second. Therefore, adjustment of the tapping 64 of the tapped resistance element 62 serves only to alter the direct current level of the output amplifier device, in this case the grid bias of the tube 40; the A.-C. potential which exists entirely across the resistive element 66 being applied without change in level to the input circuit, in this case between the cathode 42 and the control grid 46 of the output amplifier tube 40. By adjusting the tapping 64, to set the grid bias on the vacuum tube 40, any desired amount of the input wave may be clipped by thresholding. For use in a television system operated according to present FCC standards it is desired that all of the wave below zero and up to 15% modulation be clipped.

The capacitance values of the reactance elements 72, 74 are determined in conjunction with the shunt and stray capacitance of the circuit. If a pair of relatively large capacitors, for example 0.1 mf., were used the desired effect would be obtained insofar as short-circuiting the tapped resistive element 62 is concerned but strong noise pulse at lower frequencies would drive the output amplifier tube 40 so that grid current would be drawn. Therefore it is desirable to use the lowest value of capacitance possible. In practice the capacitance of the reactance element 72 should be greater than that of the adjustable reactance element 74 because the former is connected to the anode electrode of the input amplifier tube 20 where the shunt capacity is high and the latter is effectively isolated by the high resistance elements of the circuit. Values of the order of 300 mmf. and 30 mmf. have been used successfully in actual circuitry; which values it should be noted are in the ratio of the order of 10:1.

Referring to Fig. 2, a combined video signal as applied to a utilization circuit, for example the grid of an image reproducing device or kinescope, is represented graphically by the entire curve 201. The curve portion 203 represents video information confined according to present broadcasting standards between the 15% and 75% modulation level indicated by the lines 205 and 207 respectively. The level corresponding to zero percentage modulation of the R.-F. carrier wave is indicated by the line 209. In practice it is desired to clip any noise or signal pulses which are between the zero–15% levels as indicated by the curve portions 211, between the lines 209 and 205, or any noise or signal pulses which go into the extrawhite region as indicated by the curve portions 213. Thus the line 205 also indicates the clipping level for the positive excursions of the waveform applied to the utilization circuit, or kinescope cathode. The negative excursions of the signal, which are the sync pulses represented by the curve portions 208 are clipped by thresholding at the kinescope input circuit. The waveform at the control grid 46 of the output amplifier device tube 40 is the same as that shown in Fig. 2 except that it is inverted. In order to effect the desired clipping at the anode 52 of the output amplifier tube 40 as described above the tapping 64 is set so that the bias on the control grid 46 is such that the tube 40 is cut off for all values of applied voltage below the predetermined threshold level corresponding to the line 205 in Fig. 2, remembering that the curve now under discussion is inverted with respect to the one shown. The output wave is thus clipped at the desired predetermined clipping level by thresholding in the input circuit of the amplifier tube 40.

In a practical embodiment of the invention constructed along the lines of the circuit shown in Fig. 1 the values listed were given to pertinent components.

| Ref. No. | Component | Value or type |
|---|---|---|
| 20 | Input amplifier tube | 6CB6. |
| 40 | Output amplifier tube | 6CL6. |
| 62 | Bias adjusting resistance | 2 Megohms. |
| 66 | Signal input resistance | Do. |
| 72 | A. C. translating capacitor | 300 mmf. |
| 74 | do | 7–45 mmf. |

The power supply was set to deliver 205 volts at the points marked with a plus (+) sign and 330 volts at the points marked with a double-plus (++) sign. Obviously, other values will be suggested to those skilled in the art for other applications of the invention.

The invention claimed is:

1. A wave signal amplifier system including, a pair of amplifier devices having input and output circuits, a pair of resistive elements connected in series and coupled to the output circuit of one of said amplifier devices, one of said resistive elements having a tapping thereon and two terminals, a connection between said tapping and the input circuit of the second of said amplifier devices, capacitive reactance elements connected between said tapping and the terminals of said one resistive element and biasing means including said resistive elements for connection with the input circuit of said second amplifier device to render said second amplifier device non-conductive in response to signal waves in excess of a predetermined amplitude, the setting of said predetermined amplitude being determined by the position of said tapping along said one resistive element.

2. A wave signal amplifier system as defined in claim 1 and wherein the connection between the output circuit of said one of said amplifier devices and the input circuit of said other of said amplifier devices is capable of carrying direct current.

3. A wave signal amplifier system including, a pair of amplifier devices having input and output circuits, a load element coupled to the output circuit of one of the said amplifier devices, a pair of resistive elements connected in series and coupled to said load element for direct current translation, one of said resistive elements having an adjustable tapping thereon and two terminals, a direct current carrying connection between said tapping and the input circuit of the second of said amplifier devices, capacitive reactance elements connected between said tapping and the terminals of said one resistive element, and biasing means including said resistive elements for connection with the input circuit of said second amplifier device to render said second amplifier device non-conductive in response to signal waves in excess of a predetermined amplitude, the setting of said predetermined amplitude being determined by the position of said tapping along said one resistive elements.

4. A video signal amplifier circuit arrangement including a controlled electron flow path device having an input circuit electrode, an output circuit electrode and a common circuit electrode, a video signal input circuit coupled between said input and common electrodes, a load element coupled between said output and said common circuit electrodes, another controlled electron flow path device having input, output and common circuit electrodes, a direct current translating system intercoupling said load element and the input circuit electrode of the other controlled electron flow path device, said system comprising a resistance element having one terminal connected to said load element, another terminal and a tapping connected to the input circuit electrode of said other controlled electron flow path device, a capacitive reactance element connected between said one terminal and said tapping, another capacitive reactance element connected between said tapping and the other terminal of said resistive element, a second resistance element having one terminal connected to the other terminal of said resistive element and another terminal, and means coupling the other terminal of said resistance element to said common circuit electrodes.

5. A video signal amplifier circuit arrangement including an electron discharge device having cathode, grid and anode electrodes, a video signal input circuit coupled between said grid and cathode electrodes, a load element coupled between said anode and cathode electrodes, another electron discharge device having cathode, grid and anode electrodes, a load device coupled between said anode and cathode electrodes of said other electron discharge device, a direct current translating system intercoupling the anode electrode of said one electron discharge device and the grid electrode of the other electron discharge device, said system comprising a first resistive element having one terminal connected to the anode electrode of one said device, another terminal and an adjustable tapping connected to the grid electrode of the other device, a capacitive reactance element connected between said one terminal and said tapping, another capacitive reactance element connected between said tapping and the other terminal of said resistive element, a second resistance element having a terminal connected to the other terminal of said first resistive element and another terminal, and means to apply bias potential between the other terminal of said resistance element and said cathode electrodes to bias said other electron discharge device at a level to clip all video signal information above a given amplitude, said bias level being adjustable in accordance with the position of said tapping on said first resistive element.

6. A video signal amplifier circuit arrangement including a controlled electron flow path device having an input circuit electrode, an output circuit electrode and a common circuit electrode, a video signal input circuit coupled between said input and common electrodes, a load element coupled between said output and said common circuit electrodes, another controlled electron flow path device having input, output and common circuit electrodes, a load device coupled between said output and common circuit electrodes of said other controlled electron flow path device, a direct current translating system intercoupling the output circuit electrode of said one controlled electron flow path device and the input circuit electrode of the other controlled electron flow path device and having a resistive branch connected to the common circuit electrodes of both of said devices, said system comprising a resistance element having one terminal connected to the output circuit electrode of said one device, another terminal and an adjustable tapping connected to the input circuit electrode of the other device, a capacitive reactance element connected between said one terminal and said tapping, an adjustable capacitive reactance element connected between said tapping and the other terminal of said resistance element, and means to connect said other terminal to said resistive branch, said tapping and said adjustable capacitive reactance element being adjusted to clip all video signal information beyond a given level.

7. For use in a television receiver, a video amplifying system for clipping signals having an amplitude greater than a predetermined level comprising the combination of a first electron tube having an anode, cathode and control grid, a signal input circuit for said first electron tube connected with said control grid, a signal output circuit connected with said anode, operating potential supply means connected between said anode and cathode for maintaining said anode at a potential positive with respect to said cathode, a second electron tube having an anode, cathode and control electrode, a signal input circuit for said second tube including first and second resistors connected in series providing a direct current connection between the anode and cathode of said first electron tube, an adjustable tap on said first resistor, means providing a direct current path connecting said adjustable tap to the control grid of said second tube, first and second capacitor means connected respectively from said tap to opposite terminals of said first resistor to provide low impedance to video signals across said first resistor whereby adjustment of said tap along said first resistor does not change the level of the video signal applied to the control electrode of said second tube, and biasing means including said first and second resistors connected between the grid and cathode of said second tube for biasing said second tube to be non-conductive in response to video signals in excess of a predetermined amplitude, said predetermined amplitude being adjusted in accordance with the setting of said adjustable tap.

8. For use in a television receiver, a video amplifying system for clipping signals having an amplitude greater than a predetermined level comprising the combination of a first electron tube having an anode, cathode and control grid, a signal input circuit for said first tube connected with said control grid, a signal output circuit connected with said anode, operating potential supply means connected between said anode and cathode for maintaining said anode at a potential positive with respect to said cathode, a second electron tube having an anode, cathode and control electrode, means providing a source of automatic gain control potential, a signal input circuit for said second tube including said source of automatic gain control potential and a potentiometer connected in series between the anode of said first electron tube and a point of fixed reference potential, a movable tap on said potentiometer connected with the control grid of said second tube, first and second capacitor means connected respectively from said tap to opposite terminals of said potentiometer to provide low impedance to video signal across said potentiometer whereby adjustment of said tap along said first resistor does not change the level of the video signal applied to the control electrode of said second tube, and biasing means including said potentiometer and said source of automatic gain control potential connected between the grid and cathode of said second tube for biasing said second tube to be non-conductive in response to video signals in excess of a predetermined amplitude, said predetermined amplitude being adjustable in accordance with the setting of said movable tap.

References Cited in the file of this patent

UNITED STATES PATENTS

| | | |
|---|---|---|
| 2,356,140 | Applegarth | Aug. 22, 1944 |
| 2,369,138 | Cook | Feb. 13, 1945 |
| 2,571,112 | Cowles | Oct. 16, 1951 |
| 2,549,833 | Martinex | Apr. 24, 1951 |

FOREIGN PATENTS

| | | |
|---|---|---|
| 423,194 | Great Britain | Jan. 28, 1935 |